United States Patent
Lagarrigue

(10) Patent No.: US 7,151,916 B2
(45) Date of Patent: Dec. 19, 2006

(54) METHOD OF RECEIVING A SIGNAL AND A RECEIVER

(75) Inventor: Frederic Lagarrigue, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 822 days.

(21) Appl. No.: 10/082,858

(22) Filed: Oct. 19, 2001

(65) Prior Publication Data

US 2002/0123318 A1    Sep. 5, 2002

(30) Foreign Application Priority Data

Oct. 26, 2000  (GB) ................ 0026206.3

(51) Int. Cl.
*H04B 1/10* (2006.01)
(52) U.S. Cl. ............. 455/295; 455/306; 455/67.13
(58) Field of Classification Search ............ 455/295, 455/67.13, 309, 304, 306, 101, 506; 375/229, 375/347, 350; 370/347
See application file for complete search history.

(56) References Cited

U.S. PATENT DOCUMENTS

| | | | |
|---|---|---|---|
| 4,415,872 A * | 11/1983 | Karabinis ................ 333/18 |
| 5,226,060 A | 7/1993 | Goodson et al. ............... 375/14 |
| 5,237,332 A * | 8/1993 | Estrick et al. ............... 342/174 |
| 5,257,286 A | 10/1993 | Ray ........................... 375/12 |
| 5,274,670 A * | 12/1993 | Serizawa et al. ........... 375/231 |
| 5,917,855 A | 6/1999 | Kim ........................... 375/229 |
| 6,026,130 A * | 2/2000 | Rahmatullah et al. ...... 375/340 |

FOREIGN PATENT DOCUMENTS

| JP | 10-117380 | * | 5/1998 |
| WO | WO0028691 | | 5/2000 |

OTHER PUBLICATIONS

Gao et al.: "Adaptive linearization schemes for weakly nonlinear systems using adaptive linear and nonlinear FIR filters," Midwest Symposium On Circuits And Systems, Aug. 12-14, 1990, pp. 9-12.

* cited by examiner

*Primary Examiner*—Melur Ramakrishnaiah
(74) *Attorney, Agent, or Firm*—Aaron Waxler; Paul Im

(57) ABSTRACT

A method of, and receiver for, countering distortions in radio channels due to intersymbol interference (ISI) and other non-linearities in a radio link, comprises a first equalizer (48) using a training sequence for equalizing one type of distortion, say that due to ISI, and a second equalizer (50) coupled to recieve the equalizing output of the first equalizer and using another training sequence for equalizing another type of distortion. The first and second equalizers may be fractionally spaced equalizers.

7 Claims, 4 Drawing Sheets

METHOD OF RECEIVING A SIGNAL AND A RECEIVER

The present invention relates to receiving a signal propagated over a signal channel and to a receiver. The present invention has particular, but not exclusive, application to signals propagated over a radio signal channel. Such signals may conform to a TDMA protocol such as is used in the DECT (Digitally Enhanced Cordless Telephone) standard.

It is well known that radio signals transmitted to a receiver in a mobile telephone environment are subject to distortion as a result of intersymbol interference (ISI) as a consequence of multipath effects. In order to mitigate the effects of ISI, it is known in the communications field to equalise a received signal. In its simplest form an equaliser is a digital transversal filter whose coefficients are determined to counter the effects of channel distortion and restore the recovered waveform prior to it being sliced to provide a binary output. A training sequence is used in determining the contemporaneous filter coefficients. The training sequence is included in a signal to be transmitted and also is stored in a ROM at the receiver. The version of the training sequence recovered from a received signal is compared with that stored in the ROM and the coefficients of the transversal filter are adjusted to minimise the difference between distorted training sequence and the prestored version. Other types of equalisers are decision feedback equalisers and Viterbi equalisers.

For a baseband equalisation process, a training sequence generally consists of a known sequence of symbols or bits. When the impulse response of a signal channel is short compared to the symbol length, the binary bit stream itself is not sufficient to acquire the critical information relating to ISI. This problem of the short impulse response is overcome to a degree by operating fractionally-spaced equalisers on a received signal which is sampled at a frequency higher than the symbol rate. The pre-stored training sequence is oversampled taking into account the shape of the received data.

ISI is not the only source of distortion in a radio link which includes the transmitter, the radio channel and the receiver. The frequency modulation process in the transmitter and the frequency demodulation process in the receiver can introduce non-linear distortions. Additional sources of non-linear distortions comprise filters and limiters. Such non-linear effects cannot be properly estimated by an equaliser whose primary objective is to eliminate distortion due to ISI. Additionally, if the training sequence does not take these non-linear distortions into consideration, the convergence of the equaliser can be unreliable and may lead to the received signal being distorted more after equalisation than before equalisation.

It is an object of the present invention to equalise a received signal more effectively.

According to a first aspect of the present invention there is provided a method of receiving a signal propagated over a signal channel, comprising receiving and demodulating the signal, equalising the demodulated signal in a first operation to counter a first type of distortion and in a second operation equalising the signal from the first operation to counter a second type of distortion.

According to a second aspect of the present invention there is provided a receiver comprising means for receiving a signal propagated over a signal channel, means for demodulating the received signal, a first equalising stage coupled to the demodulating means for countering a first type of distortion and a second equalising stage coupled to the first equalising stage for countering a second type of distortion.

In an implementation of the method in accordance with the present invention the first operation endeavours to counter the effects of distortion, such as ISI, introduced by the signal channel, and the second operation endeavours to counter non-linear distortions introduced by the transmitting and receiving equipments. In the first operation a training sequence which includes the non-linear characteristics present in the transmitting and receiving equipment is used and in the second operation a training sequence is used which excludes the non-linear characteristics present in the transmitting and receiving equipment.

Since the signal channel between a couple consisting of a receiver and a transmitter is likely to be different than that between another couple consisting of the receiver and another transmitter, the receiver may store several training sequences, rather than one, and have means for selecting an optimum one of the training sequences to match the current couple.

By the method in accordance with the present invention, the receiver performance is enhanced firstly because each source of distortion is addressed independently and thus can be removed to a greater extent, and secondly the risk of divergence (as opposed to convergence) of a single, all in one process is reduced.

The present invention will now be described, by way of example, with reference to the accompanying drawings, wherein.

Figure 2:
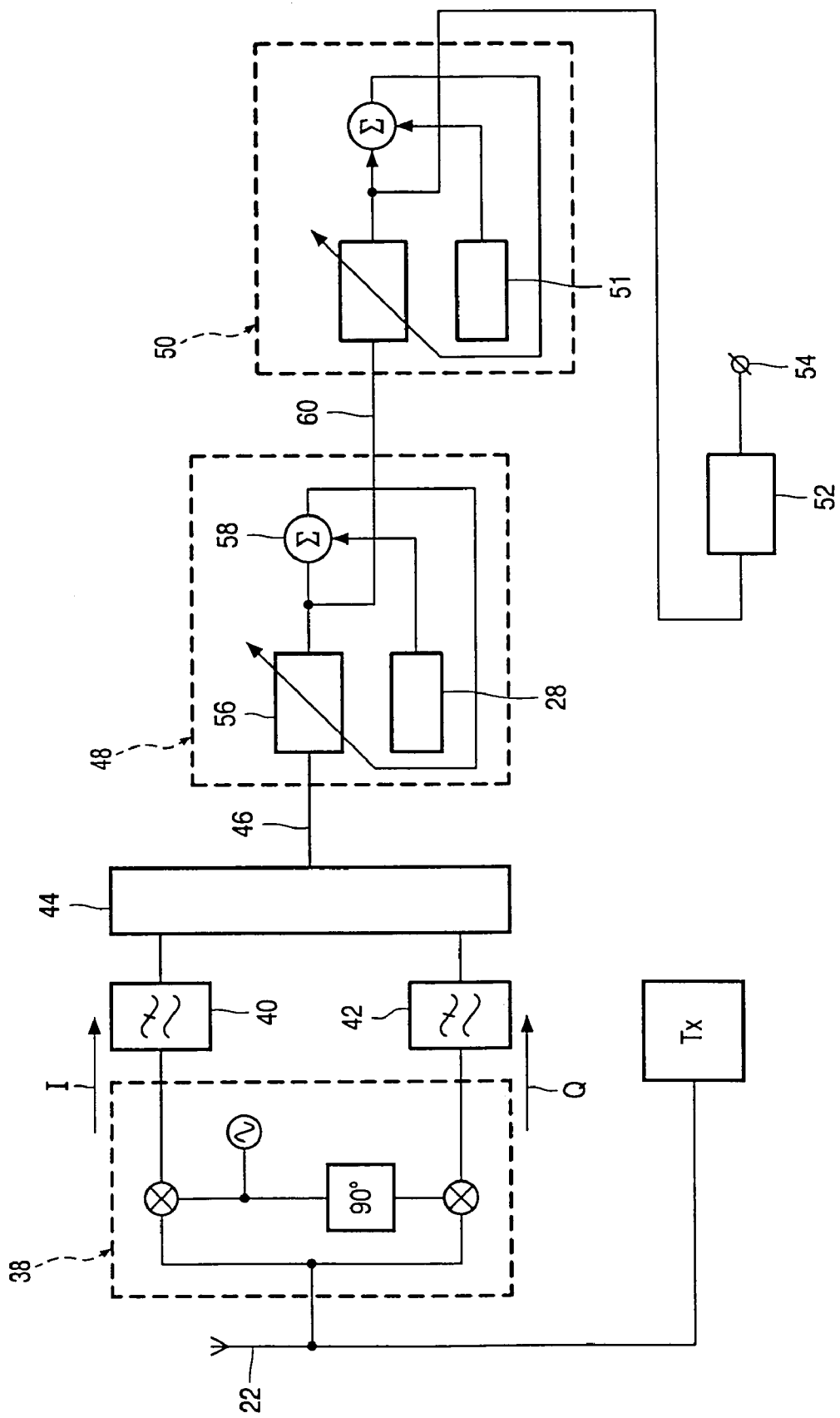
FIG. 2 is a block schematic diagram of a radio receiver used in the radio system.
Figure 3:
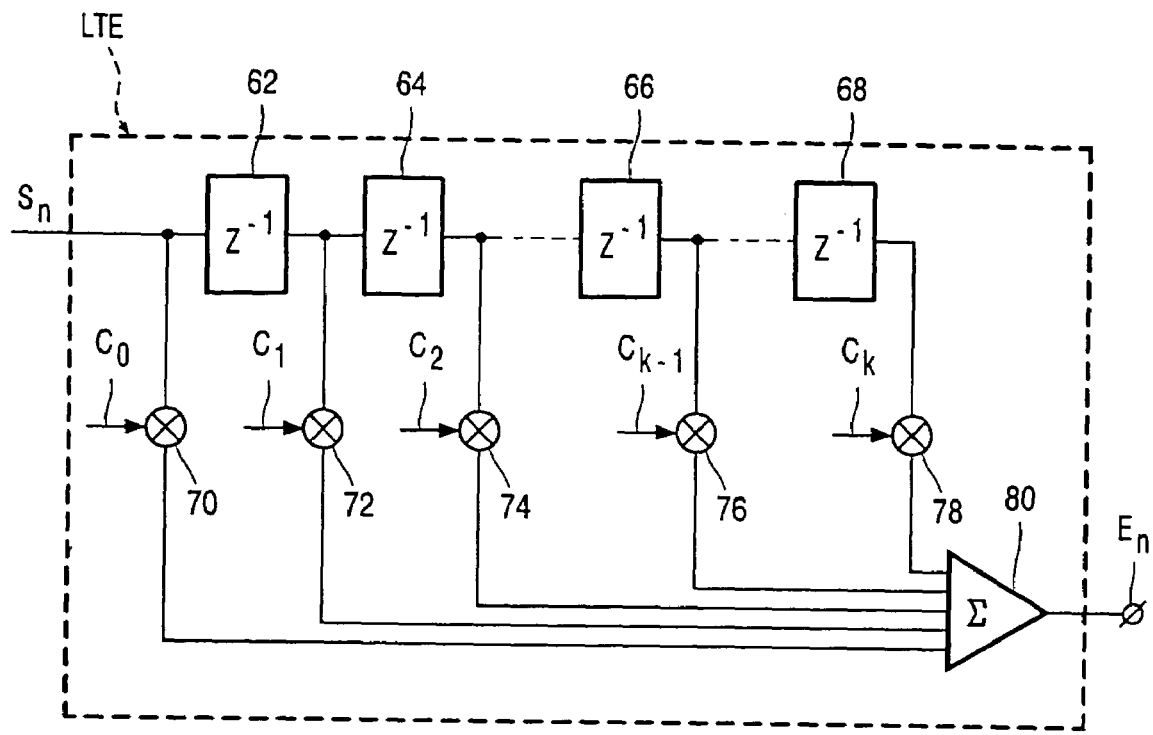
Figure 4:
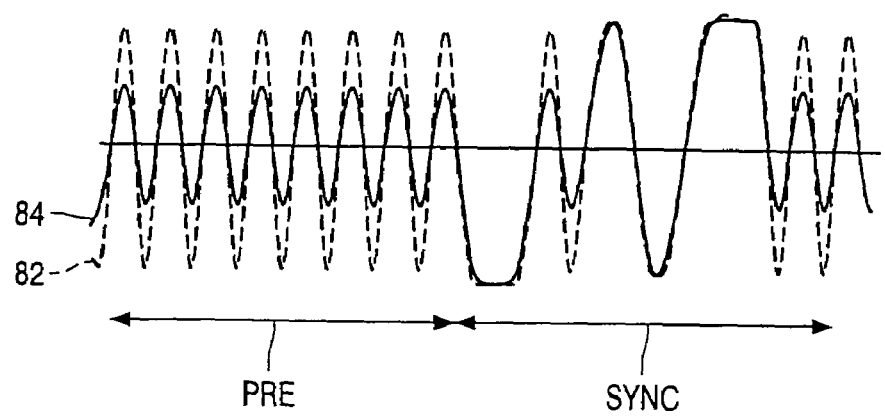
Figure 5:
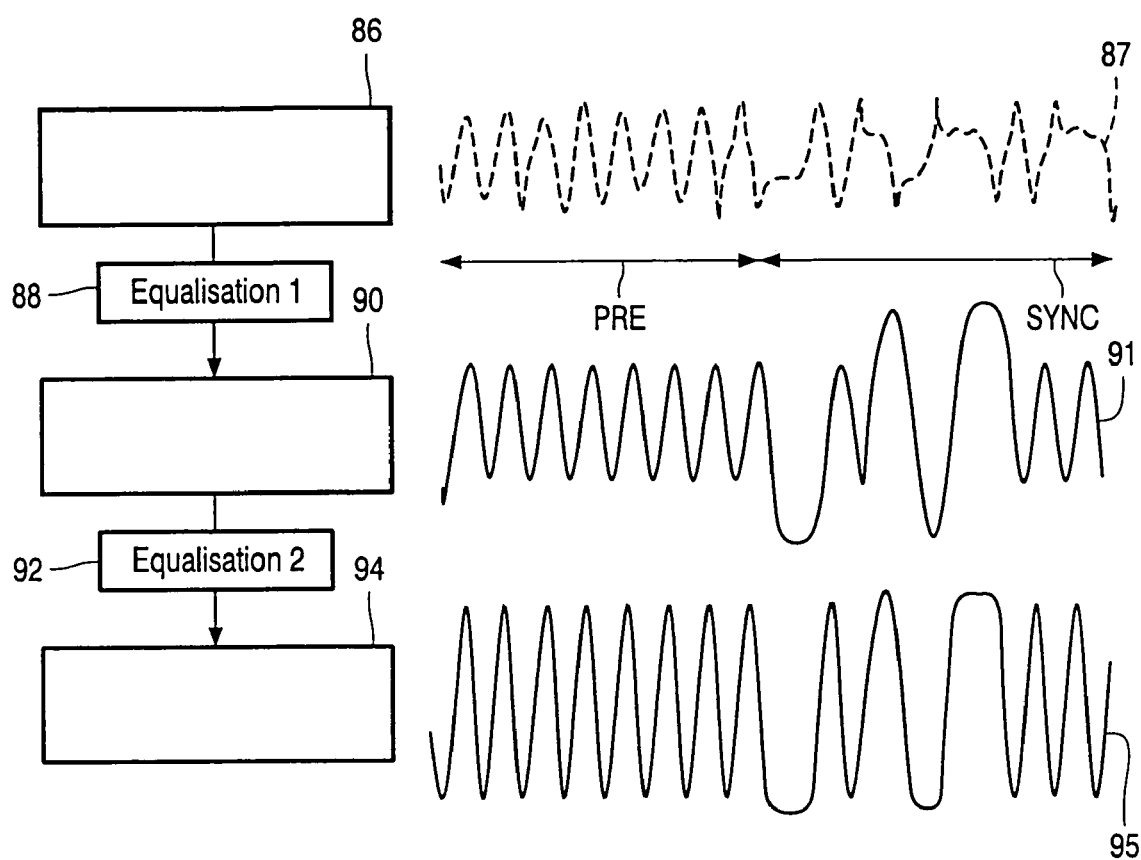

FIG. 3 is a block schematic diagram of a linear transversal equaliser suitable for use in the radio receiver shown in FIG. 2, FIG. 4 illustrates in broken lines a theoretical training sequence and in a continuous trace a measured training sequence, and FIG. 5 shows the effects of a two-stage equalisation on the baseband waveforms of the preamble and synchronisation code word of a typical DECT slot.

In the drawings the same reference numerals have been used to indicate corresponding features.

Figure 1:
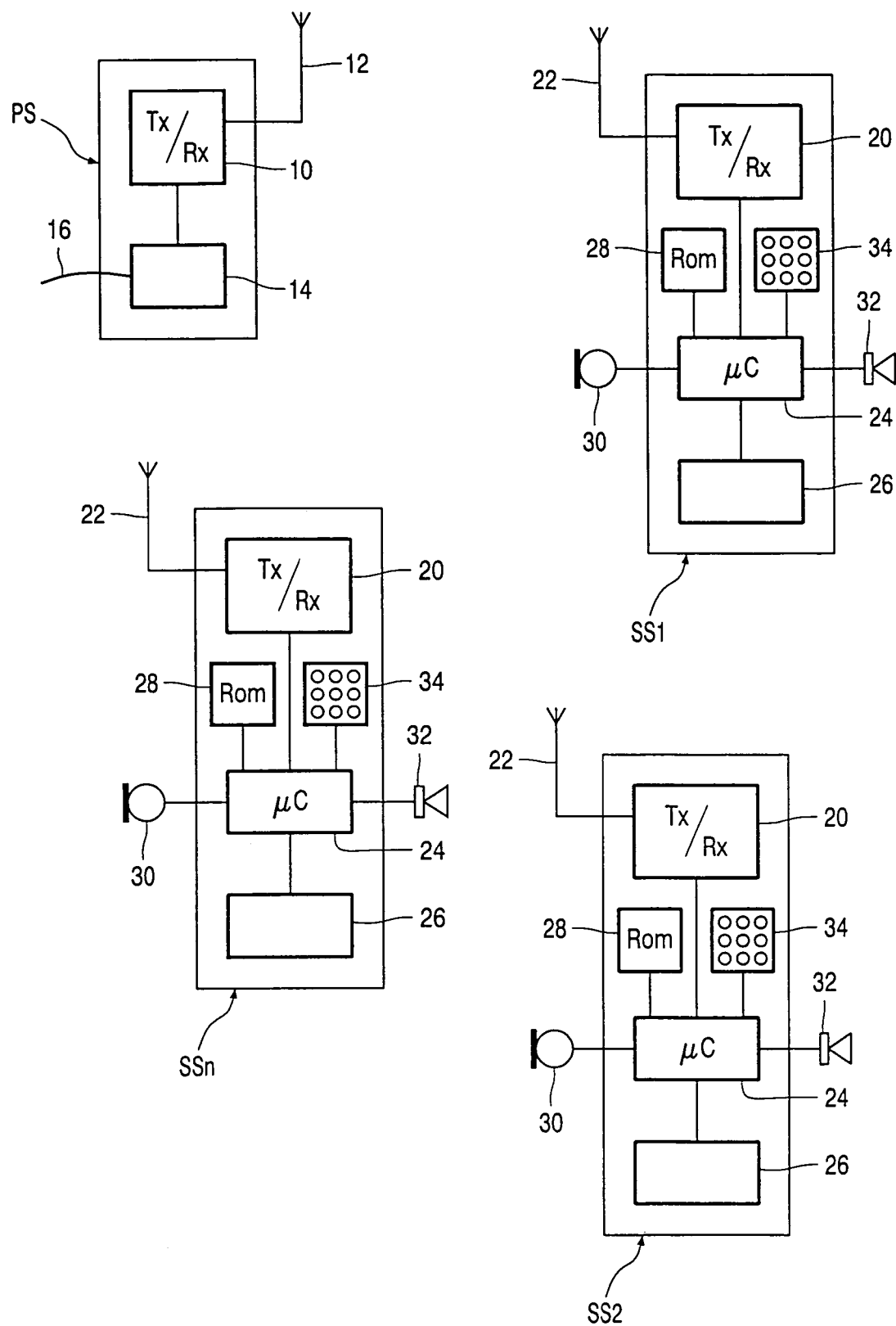
FIG. 1 is a block schematic diagram of a radio system.

The system shown in FIG. 1 comprises a primary station PS including a transceiver 10 coupled to an antenna 12 and to a controller 14 which controls the operation of the primary station. A PSTN line 16 is coupled to the controller 14 and provides a means for the primary station to communicate outside the cordless phone system of which the primary station is a part.

A plurality of cordless secondary stations SS1, SS2, SSn are able to roam relative to the primary station. Each of the secondary stations SS1, SS2, SSn is essentially the same and comprises a transceiver 20 connected to an antenna 22 and to a microcontroller 24 which controls the operation of the secondary station in accordance with software stored in a program memory 26. Data, such as training sequences for use in equalising operations, is stored in a ROM 28. A microphone 30, a loudspeaker 32 and a keypad 34 are also coupled to the microcontroller 24.

In the case of the system operating in accordance with the DECT protocol, the system is a FDMA/TDMA one having ten frequency channels, each of which comprises twelve duplex voice channels. A secondary station wishing to make a call, listens to all the available channels and selects the best channel on which to make a call. A call may comprise digitised speech or data.

Transmissions from one station to another are likely to be subject to multipath effects which will cause intersymbol interference (ISI) at the receiving station. Also non-linearities in the modulation and demodulation of the signals will cause additional distortion of the signals received by the receiving station.

In accordance with the method of the present invention, each type of distortion is countered independently of the other (or others). A suitable transceiver architecture is shown in FIG. 2. The receiving part will be described in greater detail because it is relevant to the method in accordance with the present invention but the transmitter will not be described.

The antenna 22 is coupled to a zero or low IF quadrature frequency down conversion stage 38 which provides I and Q outputs to respective low pass filters 40, 42 which pass the wanted baseband components. A demodulator 44 demodulates the signal and provides a data signal on its output 46. A first equaliser 48 counters the distortion due to ISI in the data signal and a second equaliser 50 counters the non-linear effects in the modulation and demodulation of the data signal to produce a waveform which is supplied to a bit slicer 52 which produces the digital data/digitised speech on its output 54.

Each of the first and second equalisers 48, 50 can be of the same construction. For convenience of description, the first equaliser 48 will be described in greater detail. The first equaliser comprises a FIR filter 56 having an input for receiving a signal from a previous stage, in this instance the demodulator 44, and an output coupled to a summing stage 58 and to an output terminal 60. The ROM 28 storing the training sequence(s) is coupled to the summing stage 58. An output of the summing stage 58 is used to adjust the coefficients of the FIR filter 56.

FIG. 3 shows a first equalisation stage formed by a linear, fractionally spaced equaliser, such as a linear transversal equaliser LTE which comprises a plurality of series connected time delay stages 62, 64, 66 and 68 each having a time delay $z^{-1}$. The input $S_n$ to the first delay stage 62 and outputs of all the delay stages 62 to 68 are coupled to respective multipliers 70 to 78 to which respective filter coefficients $c_o$ to $c_k$ are applied. Outputs from the multipliers 70 to 78 are combined in a summing stage 80 to provide an output signal $E_n$. This output signal can simply be written as:

$$E_n = \sum_i c_i \cdot S_{n-1}$$

where $S_n$ is the sampled base band signal, and $c_k$ represents the equaliser coefficients or taps.

The values of the respective coefficients $c_o$ to $c_k$ are determined to compensate for the distortion to the signal during its transmission. A training sequence is used to this process.

In accordance with the method of the present invention the training sequence which includes the non-linear aspects of the transmission link is chosen. Thus the equaliser attempts to compensate only for distortions occurring within the radio channel, including ISI, and the risk of bad convergence is reduced compared to a typical Gaussian-shaped sequence.

Instead of trying to model the non-linear effects with a pulse—shaping filter, the optimum training sequence can be obtained from a measurement of a desired sequence received in ideal transmission conditions, that is no ISI and high Signal-to-Noise Ratio (SNR), using a wired connection for example. The measured signal can then be digitised depending on the equalisation requirements, that is, sampling frequency and number of bits of definition, and the result can be stored in a memory. In the case of DECT, the synchronisation word present in the S—field of every transmitted packet can be used as the training sequence.

FIG. 4 shows two versions of the S field comprising preamble PRE and synchronisation code word SYNC. The trace 82 shown in broken lines shows the result of shaping by the Gaussian filter only, while the continuous trace 84 is an example of a measurement to be used as the chosen training-sequence. This particular example was measured at the output of the demodulator of a DECT base station, in ideal transmission conditions. The main difference between the waveforms 82, 84 comes from the IF filter used at the receiver. More particularly the continuous trace 84 includes all the non-linear phenomena present in the transmitter and the receiver. The waveform 84 is therefore digitised to build-up a training sequence for a DECT fractionally-spaced equalisation.

A second stage of equalisation, that is the stage 50 (FIG. 2), is used to compensate for the intrinsic non-linearities of the radio link. This second stage may take one of several forms, for example (1) a decision feedback equaliser with an adaptive algorithm, such a RLS/LMS, using a training sequence, (2) an MSLE equaliser (Maximum—Likelihood Sequence Estimation) based on the Viterbi algorithm, or (3) a simple transversal equaliser identical to the first stage 48 (FIG. 2) and comprising a ROM 51 storing a training sequence. The simple transversal equaliser may have a limited performance in removing non-linear effects but has the advantage of being simpler.

The choice of the training sequence must be such as not to include the non-linearities which it is required to compensate for. A Gaussian-shaped training sequence such as is shown by the broken line trace 82 (FIG. 4) would be appropriate. In the case of DECT, there is some flexibility in defining the shape of the Gaussian filter. The parameter BT which defines the bandwidth of this filter can typically vary from 0.3 to 0.7.

FIG. 5 summarises the 2 stage equalisation process in accordance with the present invention by showing the base band waveforms of the preamble PRE and the synchronisation code word SYNC. The rectangle 86 and its associated trace 87 represent the distorted waveform due to perturbations from the radio channel. The rectangle 88 represents the first equalisation stage using the measured training sequence. The rectangle 90 and its associated trace 91 represent the waveform still containing the intrinsic non-linearities of the radio link. The rectangle 92 represents the second equalisation stage using say a Gaussian filter. The rectangular 94 and its associated trace 95 represent the original waveform retrieved for an optimum performance.

Since each transceiver architecture implies its own set of non-linear effects, then there is only one ideal training sequence per couple of a transmitter/a receiver. In order to improve the equalisation process, several training sequences could be stored instead of one sequence. These training sequences would be obtained from measurements of the desired waveform made for different transmitter/receiver couples.

The first few slots of a transmission could be used to select the optimum training sequence, that is, the one that matches the current transmitter/receiver couple. This could be done for example by autocorrelation. Then, the following time slots could use the selected training sequence to perform the first equalisation process.

A similar approach may be used for the second equalisation process and in this instance a table of different waveforms corresponding to different BT factors could be stored. Like the first equalisation stage the optimum training sequence can be selected in the first few slots of a transmission and subsequent slots used for performing equalisation with the selected training sequence.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of cordless and cellular systems and component parts therefor and which may be used instead of or in addition to features already described herein.

The invention claimed is:

1. A method of receiving a signal propagated over a signal channel, comprising receiving and demodulating the signal, equalising the demodulated signal in a first operation to counter a first type of distortion and in a second operation equalising the signal from the first operation to counter a second type of distortion, and storing training sequences for respective couples of transmitting and receiving equipments and by selecting the optimum training sequence for a currently used couple of transmitting and receiving equipments.

2. A method as claimed in claim 1, characterised in that the equalisation in the first operation is to counter distortion introduced by the signal channel.

3. A method as claimed in claim 1, characterised in that the equalisation in the first operation is to counter intersymbol interference (ISI).

4. A method as claimed in claim 2, characterised in that the equalisation in the second operation is to counter distortions introduced by transmitting and receiving equipments.

5. A method as claimed in claim 4, characterised by training an equalising stage used in the first operation using a first training sequence which includes the non-linear characteristics present in the transmitting and receiving equipment.

6. A method as claimed in claim 4, characterised by training an equalising stage used in the second operation using a second training sequence which counters the non-linear characteristics present in the transmitting and receiving equipment.

7. A receiver comprising means for receiving a signal propagated over a signal channel, means for demodulating the received signal, a first equalising stage coupled to the demodulating means for countering a first type of distortion and a second equalising stage coupled to the first equalising stage for countering a second type of distortion, wherein the first equalising stage includes means for storing a first training sequence and the second equalising stage includes means for storing a second training sequence and means for storing a plurality of the first and second training sequences for respective couples comprising the receiver with different transmitters and means for selecting an optimum training sequence for a currently used couple.

* * * * *